(12) United States Patent
Martin Galindo et al.

(10) Patent No.: US 10,097,229 B2
(45) Date of Patent: Oct. 9, 2018

(54) CASE FOR A MOBILE TERMINAL

(71) Applicant: Antonio Cabezas Funes, Madrid (ES)

(72) Inventors: Jose Miguel Martin Galindo, Torrejon de Ardoz (ES); Alberto Martin Diaz, Torrejon de Ardoz (ES)

(73) Assignee: FORE FINGER 360 DESARROLLOS, S.L. (ES)

( * ) Notice: Subject to any disclaimer, the term of this patent is extended or adjusted under 35 U.S.C. 154(b) by 0 days.

(21) Appl. No.: 15/314,164

(22) PCT Filed: May 27, 2015

(86) PCT No.: PCT/ES2015/070414
§ 371 (c)(1),
(2) Date: Nov. 28, 2016

(87) PCT Pub. No.: WO2015/181426
PCT Pub. Date: Dec. 3, 2015

(65) Prior Publication Data
US 2017/0201284 A1    Jul. 13, 2017

(30) Foreign Application Priority Data

May 27, 2014   (ES) ............................... 201430738 U

(51) Int. Cl.
| | |
|---|---|
| *H04M 1/00* | (2006.01) |
| *H04B 1/38* | (2015.01) |
| *H04B 1/3888* | (2015.01) |
| *H04B 1/3877* | (2015.01) |

(52) U.S. Cl.
CPC ......... *H04B 1/3888* (2013.01); *H04B 1/3877* (2013.01)

(58) Field of Classification Search
CPC .................................................... H04B 1/3888
USPC ............ 455/575.8, 575.1, 575.3, 575.4, 90.3
See application file for complete search history.

(56) References Cited

U.S. PATENT DOCUMENTS

| | | | | |
|---|---|---|---|---|
| 8,060,634 | B1 * | 11/2011 | Darnell | ............... H04L 67/1095 |
| | | | | 709/218 |
| 8,382,059 | B2 * | 2/2013 | Le Gette | ................ F16M 11/04 |
| | | | | 248/163.1 |
| 8,978,883 | B2 * | 3/2015 | Gandhi | ................... A45C 11/00 |
| | | | | 206/320 |
| 9,227,763 | B2 * | 1/2016 | Gengler | ................. B65D 25/00 |
| 9,316,344 | B2 * | 4/2016 | Le Gette | .............. F16M 11/041 |
| 9,470,358 | B2 * | 10/2016 | Le Gette | ................ F16M 11/10 |
| 9,717,314 | B2 * | 8/2017 | Idehara | ................... A45C 11/00 |

(Continued)

FOREIGN PATENT DOCUMENTS

WO       2014036570 A1    3/2014

*Primary Examiner* — Tilahun B Gesesse
(74) *Attorney, Agent, or Firm* — Hayes Soloway PC

(57) ABSTRACT

Mobile terminal case with a gripping element for the user's fingers to prevent accidental falls of the mobile terminal. It comprises a base which covers at least part of the rear side of a mobile terminal, and comprises at least one recess and a folding tab of a size and configuration equal to those of the recess. The folding tab has possibility of tilting between a resting position where it is in the recess and a gripping position where it is inclined with respect to the base. The grip is achieved by means of an elastic element linked to the folding tab and to the base and which exerts a returning force on the folding tab in the direction of the resting position.

16 Claims, 8 Drawing Sheets

(56) References Cited

U.S. PATENT DOCUMENTS

| | | | |
|---|---|---|---|
| 9,788,621 B2* | 10/2017 | Kim | A45C 11/00 |
| 2012/0199501 A1* | 8/2012 | Le Gette | F16M 11/04 |
| | | | 206/45.24 |
| 2014/0027482 A1 | 1/2014 | Crawford et al. | |

* cited by examiner

CASE FOR A MOBILE TERMINAL

OBJECT OF THE INVENTION

The present invention pertains to the technical field of mobile terminal cases.

More specifically, the present invention describes a case for a mobile telephone, tablet or tablet phone, comprising a gripping element for the user's fingers, in order to prevent the mobile device from accidentally falling. The proposed case may be a supplementary item for the mobile terminal or may be the rear cover of the mobile device itself.

BACKGROUND OF THE INVENTION

Nowadays, most people possess a mobile phone. These devices have evolved into those known as smartphones with greater surface areas and smaller thicknesses.

Furthermore, in present-day society, the use of multimedia devices such as tablets or combined devices which are part smartphone and part tablet has arisen.

Said devices are specifically designed to enable their use when the user is doing other activities. In the cases where the user is employing the mobile device (telephone, tablet, tablet phone, etc.) while performing other activities, the user has no possibilities of sustain the device on a static base to enable an effective grasp of the device. An example might be the use of these devices when the person is walking, or is showing the multimedia content appearing on the screen to other persons, etc.

That is to say, the user moves the device while himself/herself moves. Thus, the only method to be able to operate the device is to use one hand to hold it, in such a way that only one hand is free to manipulate it. As both hands are necessary (one to hold the device and the other to operate it), the user cannot perform other activities while using the mobile device.

Besides, as mobile telephones, tablets and tablet phones are becoming bigger, the operation of grasping them becomes more complex. This increases the ease with which the device may fall from the hand of the user.

Due to the aforementioned drawbacks, many problems arise concerning the way of grasping mobile terminals. One of those is the worry caused to the user when is going to manipulate the device, having to concentrate on not dropping the device or ensuring the absence of factors causing the device to separate from his hand.

Another problem is discomfort when holding the device since most of times, due to its size, it cannot be held comfortably and securely with the fingers when in use.

Likewise, another problem derived from the aforementioned drawbacks is that the mobile device may fall from the hand of the user to the floor so it or any of its components may break.

DESCRIPTION OF THE INVENTION

The mobile terminal case proposed is intended to prevent the aforementioned problems by ensuring that the mobile terminal is firmly attached to the user's hand at all times.

This enables the user to perform other activities while holding the telephone, tablet or tablet phone without having to be aware of the mobile terminal continuously.

To achieve a firmly grasp of the mobile terminal in the palm of the user's hand, a case has been designed which covers at least part of the rear side of the mobile device and comprises an element which secures the position of the user's fingers.

In one example of an embodiment, the case described is an object which is not part of the mobile device itself. The user attaches it around part of said mobile terminal so as to protect it against possible knocks and to improve the grasp of the mobile device within the hand. In this case, the base of the case, in addition to covering the rear side of the mobile device, covers the lateral sides of the terminal mobile to ensure that they are perfectly held together.

In another embodiment, the case described replaces the standard cover protecting the rear part of the mobile terminal and is part of the same. This means that the mobile terminal can be manufactured directly including the case, said case being part of the device. In this embodiment, the base of the case is the rear cover of the mobile terminal.

The gripping element which enables the case to be affixed to the user's hand is a folding tab which acts by exerting pressure on one or more of the user's fingers. Said folding tab can move between a first resting position, in which it is located within a recess in the base of the case, and a second gripping position where it is inclined with regard to the base of the case.

In the gripping position, the folding tab has swung with regard to the base of the case, for example around a shaft, creating a space against said base of the case, intended to receive the user's fingers.

In this way, to grasp the mobile terminal with the case, the user holds the case in the usual way with one hand and inserts one or more fingers into the space between the folding tab and the base of the case at that point. To do this, the folding tab must be moved to the gripping position (that is, tilting it until it adopts an inclined position with regard to the base).

In order to aid the affixing of the case to the user's hand, the case comprises an elastic element. Said elastic element may be arranged so as to exert force from the extremity of the folding tab around which said folding tab tilts, in which case a clamp-like force is exerted on the user's fingers. In another embodiment, the elastic element may be located at the extremity of the folding tab which moves away from the base of the case when moved to the gripping position. In these embodiments, the elastic element, in addition to exerting the returning force in the direction of the resting position, acts as a stop to retain the user's fingers in the space between the folding tab and the base of the case.

The two types of attachment may be combined in order to increase the gripping, but either of them independently provide a gripping which enables the user to operate the mobile device comfortably, with no fear of dropping the same.

In another embodiment of the invention, the case features a rotating item intended to enable the user to grasp the mobile device in a vertical, horizontal or intermediate position. Furthermore, the user may change the position with no need to release the mobile device.

This enables, for example, a change between holding the mobile device in a vertical position, this being the position employed habitually by users in the performance of routine activities with the device, to the horizontal position, for example to watch a video at a particular moment.

This change of position of the mobile device may be performed with no need for the user to release the mobile device. The grasp is totally guaranteed, as the user does not move his/her fingers from the space formed between the folding tab and the base; the case therefore continues to perform its gripping function.

The case may also comprise more than one gripping element; that is, more than one folding tab. This embodiment is particularly practical for cases intended to be used with tablets or tablet phones, as it enables the user to hold the mobile device securely with both hands.

In an embodiment of the invention, the case may comprise, in addition to the folding tab, a pawl which enables the maintaining of the folding tab in its resting position. Preferably, one extremity of the pawl is arranged in a perimetral groove of the folding tab in the resting position. The release of the tab is performed cosily for the user, by means of a slight displacement of the pawl in the longitudinal direction of the case. This displacement occurs instantaneously when the user pulls the folding tab upwards.

DESCRIPTION OF THE DRAWINGS

As a supplement to the description made herein, and for the purpose of aiding the better understanding of the characteristics of the invention, in accordance with a preferred example of a practical embodiment of the same, a set of drawings is attached as an integral part of said description wherein, by way of illustration and not limitation, the following is portrayed.

PREFERRED EMBODIMENT OF THE INVENTION

Some embodiments of the invention are presented below with the aid of FIGS. 1 to 9.

The mobile terminal case proposed comprises at least one base (1) intended to cover at least part of the rear side of a mobile terminal, and said base (1) comprises at least one recess (2). This recess (2) may be a through-hole.

As has been described above, the base (1) may be for example the rear cover of the mobile device, this being the cover of the mobile terminals themselves that covers the battery and other elements which should not be exposed.

In another example of embodiment, said base (1) is a flat item with rounded edges with the same configuration as that of the edges of the mobile device, and which are intended to cover said edges of the mobile device. This is the embodiment shown for example in FIGS. 1a and 1b.

Further, at the edges of said base (1) may be a plurality of openings located in correspondence with the external buttons of the corresponding mobile device, in such a way that the user may have access to said buttons without having to remove the case.

The base (1) comprises an internal side which is intended to remain in contact with the mobile terminal (or with the internal elements of the mobile terminal in the embodiment in which the case is the corresponding rear cover) and an external side which is the opposite side and which is the side which is in contact with the hand of the user when the user holds the mobile device.

Said external side of the base (1) comprises a recess (2) intended to house a folding tab (3) which is the element enabling the gripping of the user's fingers.

The folding tab (3) is linked to the base (1) with tilting possibility between a resting position where it is located within the recess (2) and a gripping position where it is inclined with regard to the base (1). The resting positions of different embodiments of the invention may be seen in FIGS. 1a, 2a, 3a and 4. The gripping positions of different embodiments of the invention may be seen in FIGS. 1b, 2b and 3b. In an example of an embodiment, the folding tab (3) is of a size and configuration equal to those of the recess (2).

When the tab is in the gripping position, a space is formed between said tab and the base (1), into which the user's fingers are housed. To ensure the maintenance of the grip of the case to the user's fingers, said case comprises at least one elastic element attached to the folding tab (3) and to the base (1) configured and positioned to exert a returning force on the folding tab (3) in the direction of the resting position.

Figure 1A:
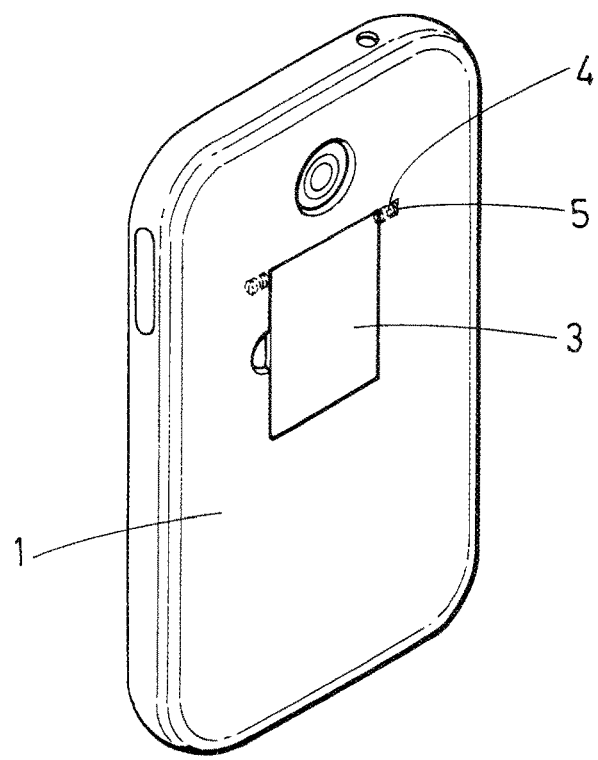
FIG. 1a shows a view of an embodiment where the case comprises a spring in a resting position.
Figure 1B:
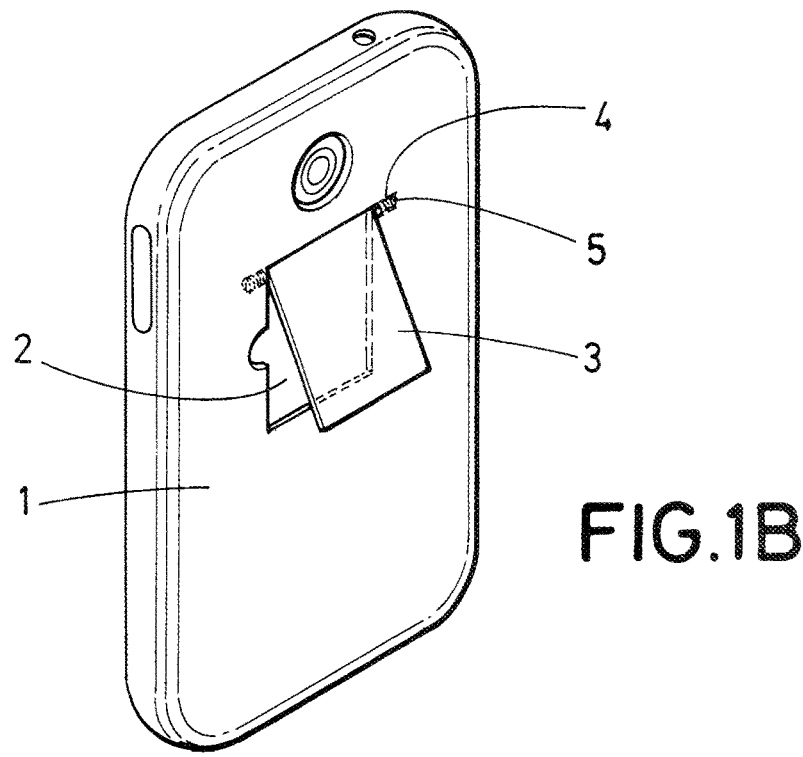
FIG. 1b shows a view of the embodiment of FIG. 1a in a gripping position.

In an example of an embodiment, shown in FIGS. 1a and 1b, the case also comprises a shaft (5) on which the folding tab (3) tilts and which is arranged longitudinally at one of the extremities of the folding tab (3).

In said figures an embodiment is shown where the elastic element is a torsion spring (4) linked to the folding tab (3) and to the base (1) and which is configured to exert a returning force on the folding tab (3) in the direction of the recess (2) in order to return it to the resting position. Thus, a clamp-like force is exerted on the user's fingers. Preferably, the torsion spring (4) is arranged around the shaft (5). The torsion spring (4) exerts a returning force.

Figure 2A:
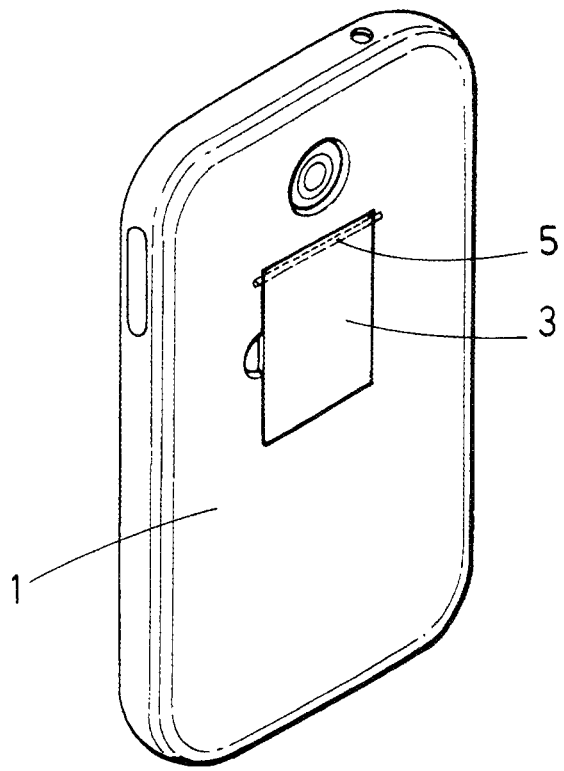
FIG. 2a shows a view of an embodiment where the case comprises an elastic tape in a resting position.
Figure 2B:
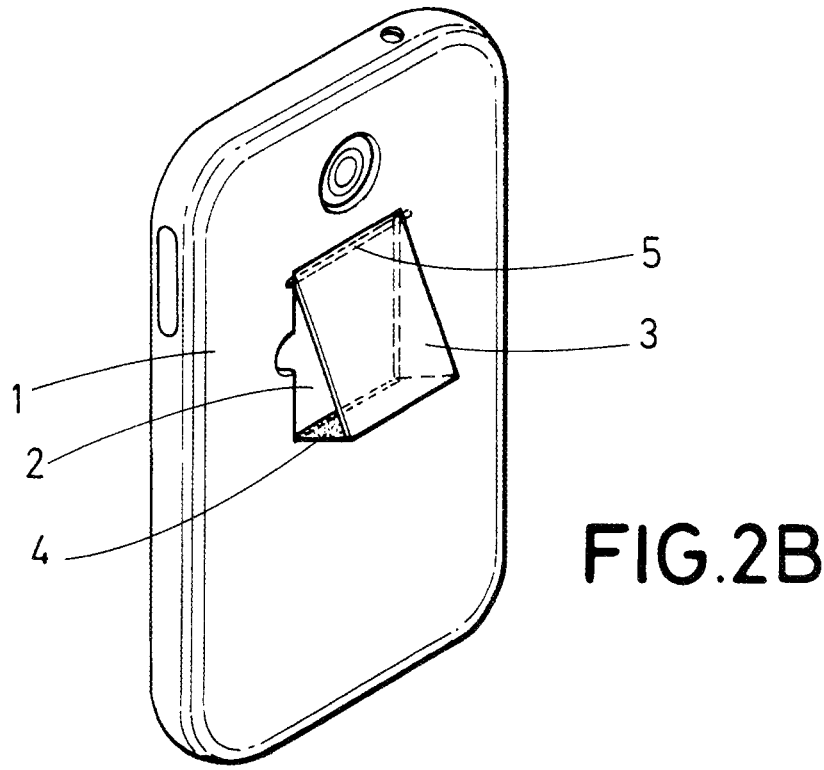
FIG. 2b shows a view of the embodiment of FIG. 2a in a gripping position.

In another possible embodiment of the invention, shown in FIGS. 2a and 2b, the elastic element is an elastic tape (7). As may be seen in these figures, the elastic tape (7) is linked to the folding tab (3) and to the recess (2). It is configured so as to exert a returning force on the folding tab (3) in the direction of the recess (2). Preferably, the case will also comprise a shaft (5) similar to that described above in order to enable the tilting movement of the folding tab (3).

Likewise, the present invention contemplates an embodiment where the case, in addition to the base (1), comprises an internal cover which is intended to remain attached to the base (1), in contact with its internal side. In this way, it is the internal cover which is in contact with the rear side of the mobile device.

Figure 3A:
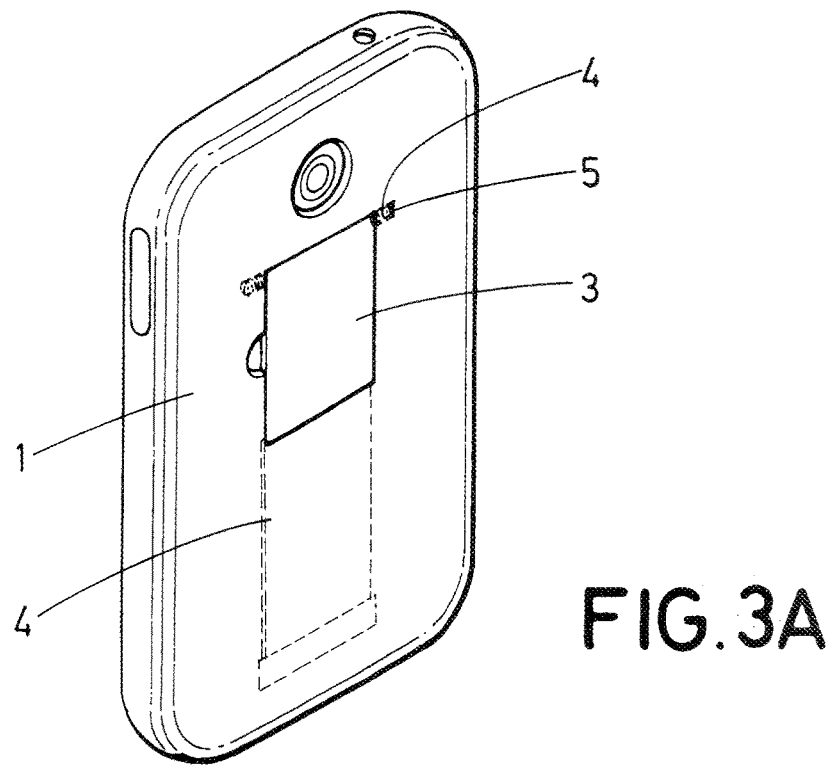
FIG. 3a shows a view of an embodiment where the case comprises a spring and an elastic tape in a resting position.
Figure 3B:
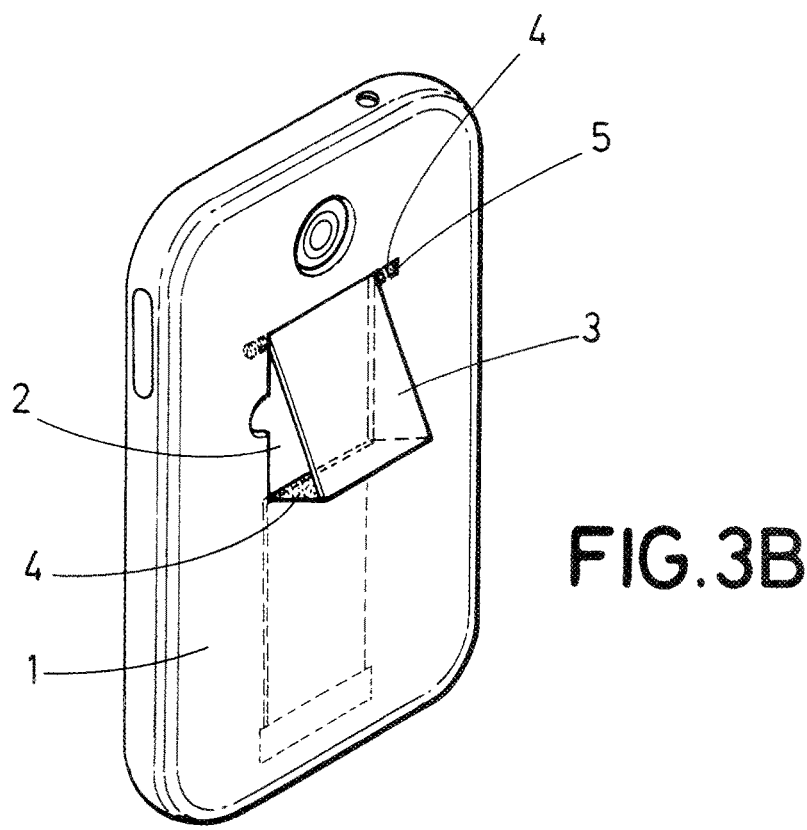
FIG. 3b shows a view of the embodiment of FIG. 3a in a gripping position.

The use of the internal cover is particularly convenient in an embodiment such as that shown in FIGS. 3a and 3b. In this embodiment, the case comprises at its base (1) an orifice which may coincide with the recess (2) or may be a groove in one extremity of the recess (2) through which the elastic element passes; in this embodiment the element is an elastic tape (7).

In this case, the elastic tape (7) is attached by one of its extremities to the folding tab (3) and the other extremity is passed through the aforementioned orifice and is attached to the base (1) on its internal side or is attached to the internal cover. In this way, when the base (1) and the internal cover are joined, part of the elastic tape (7) remains between them. Furthermore, the elastic tape (7) is attached to one of these items without this being evident to the user at first glance. This helps to maintain the aesthetics of the case, even when it is not located on the mobile device.

Figure 4:
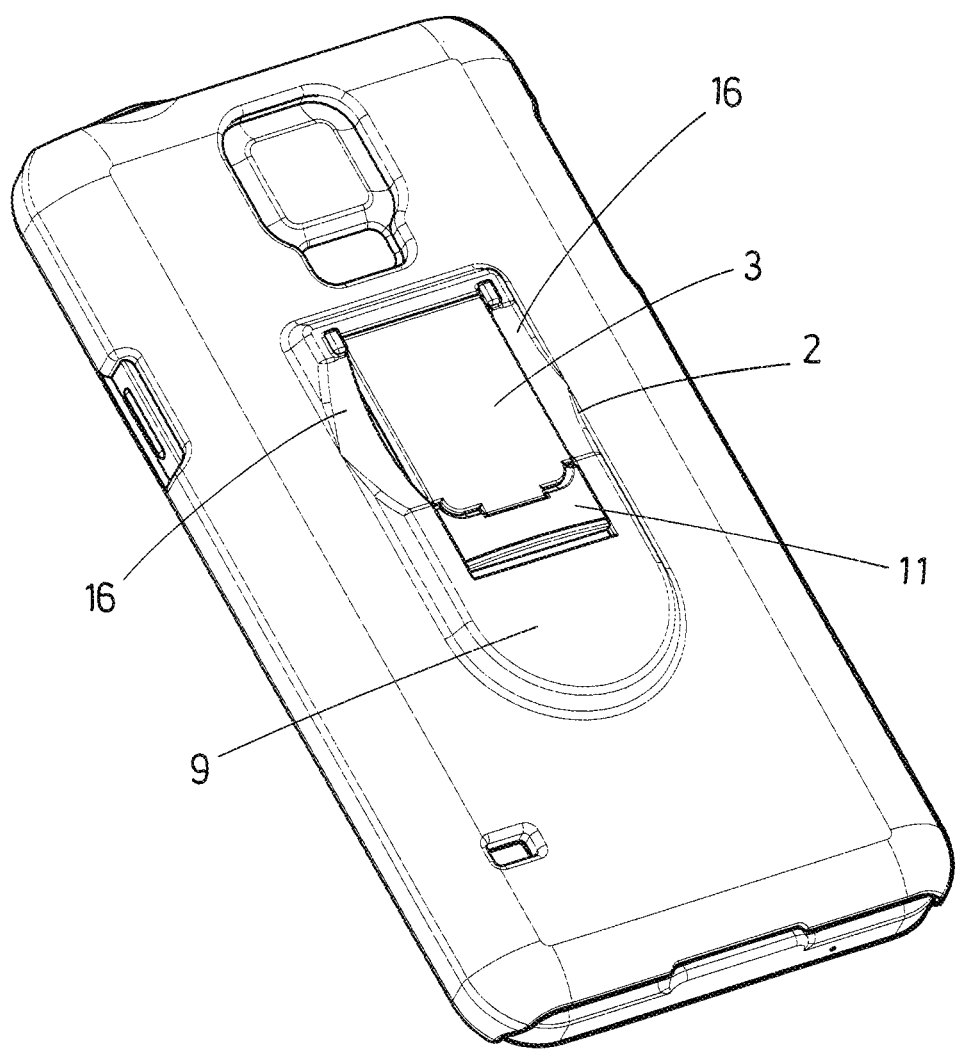
FIG. 4 shows a view of the case attached to a mobile device, in an embodiment comprising a bulge.
Figure 5:
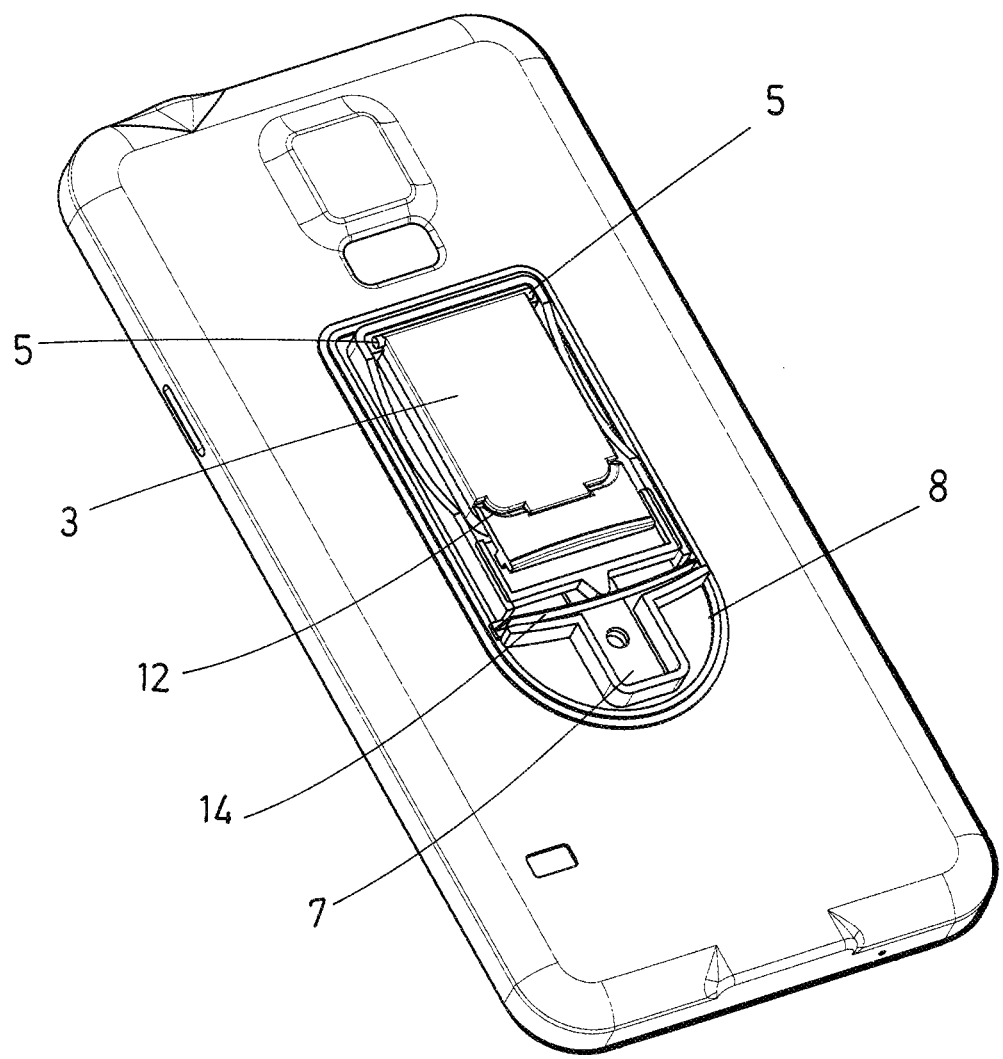
FIG. 5 shows a view of a mobile device where it is shown a supplementary part on which the folding tab and the remaining elements of the case are assembled.

In another example of an embodiment, the case comprises a supplementary part (8) comprising a housing (10) coinciding at least partially with the recess (2). Preferably the base (1) comprises a bulge within which said supplementary part (8) is placed. In FIG. 4 the case has been shown with the bulge, and in FIG. 5 the same embodiment is shown without showing the base (1), so that the supplementary part (8) may be seen. The elastic tape (7) may be found for example in the housing (10) of the supplementary part (8). This embodiment may be seen for example in FIG. 6.

Likewise, and as may be seen in said figures, the case may comprise a pawl (11) located within the recess (2) and with possibility of sliding movement within said recess (2). The object of the pawl (11) is to maintain the folding tab (3) in a resting position when applicable. In an example of embodiment said folding tab (3) comprises a perimetral groove (12) in the extremity which is displaced relative to the base (1), configured to receive a extremity of the pawl (11) in the resting position.

Figure 6:
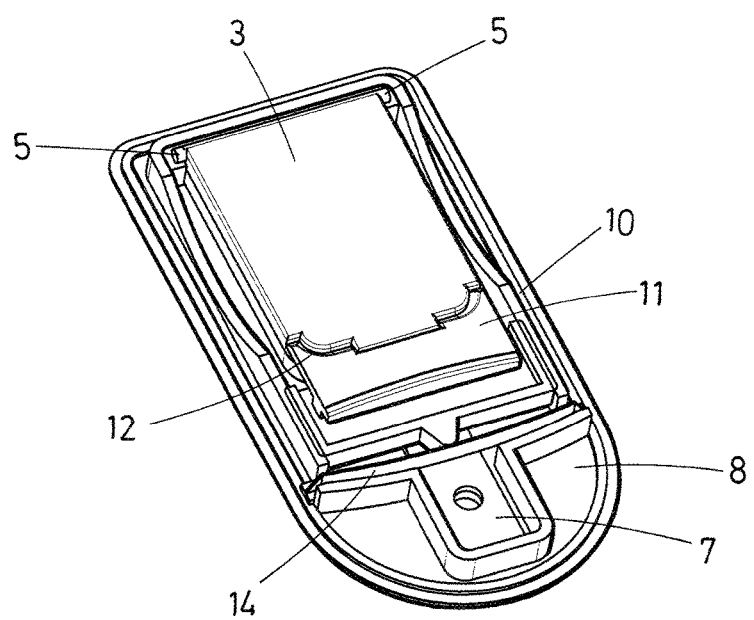
FIG. 6 shows a perspective view of the supplementary part shown in FIG. 5, and of the elements placed thereon.
Figure 7A:
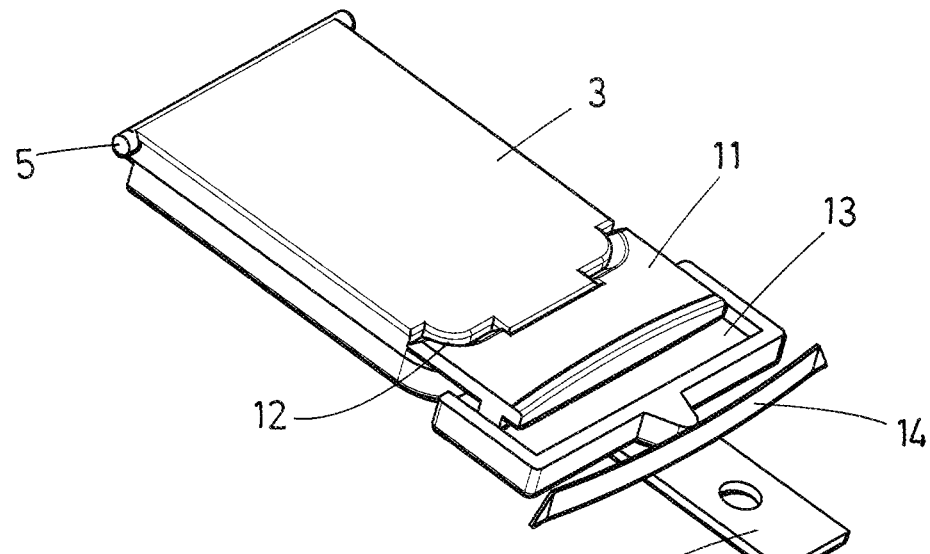
FIG. 7a shows a frontal perspective view in which the elements of FIG. 6 are shown, without showing the supplementary part itself.
Figure 7B:
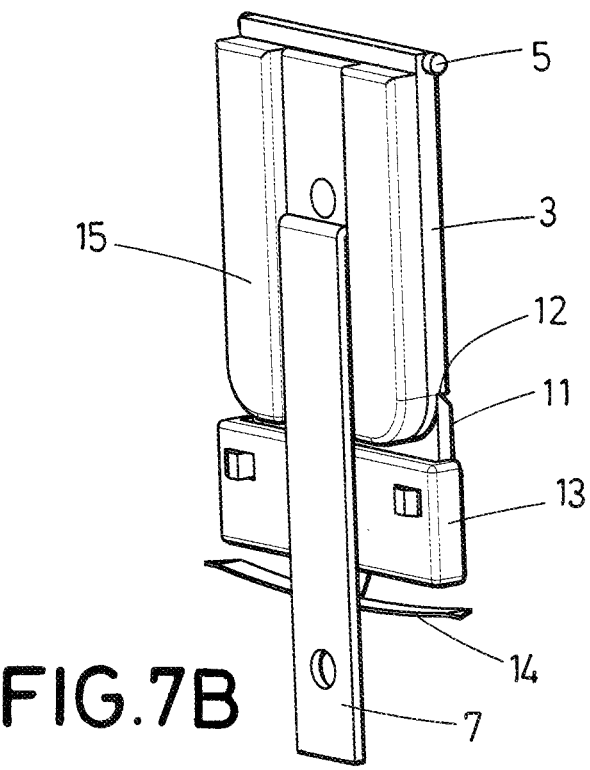
FIG. 7b shows a rear perspective view in which the elements of FIG. 6 are shown, without showing the supplementary part itself.

Also preferably, as may be seen in FIG. 6, the case comprises a pawl holder (13) located in the recess (2), located beneath the pawl and linked to the same. Said pawl holder (13) is linked to a strapping (14) which exerts a returning force on the pawl holder (13) when this is displaced by the user to allow the folding tab (3) to tilt. FIGS. 7a and 7b show clearly how these elements are joined together.

In the preferred embodiment, when the user moves the folding tab (3) upwards, pivoting on the shaft (5), as the perimetral groove (12) houses the extremity of the pawl (11) (as shown for example in FIG. 7a), the pawl (11) is also slightly moved away from the folding tab (3) until said tab is released. As the pawl (11) is linked to the pawl holder (13), the pawl holder moves solidarily with the pawl (11), preferably under the bulge of the case. The pawl holder (13) when moving from its resting position (which is the resting position of the folding tab (3)) acts upon the strapping (14), exerting force thereon. When the folding tab (3) is released, the strapping (14), which is configured to exert a returning force on the pawl holder (13), recovers its position and displaces the pawl holder (13) to its resting position once more.

When it is desired to perform the opposite movement, that is, when the user is operating the electronic device, and wants to cease using it and to place the folding tab (3) in its resting position, it is only necessary to remove the fingers from the space formed between the folding tab (3) and the base (1). At this moment, the elastic tape (7) acts to bring the folding tab to the recess (2) once more, where it becomes locked by the action of the pawl (11) (which has, once again, performed the same movement as that described above to allow the passage of part of the extremity of the folding tab (3) and to lodge its extremity in the perimetral groove (12)).

Figure 8:
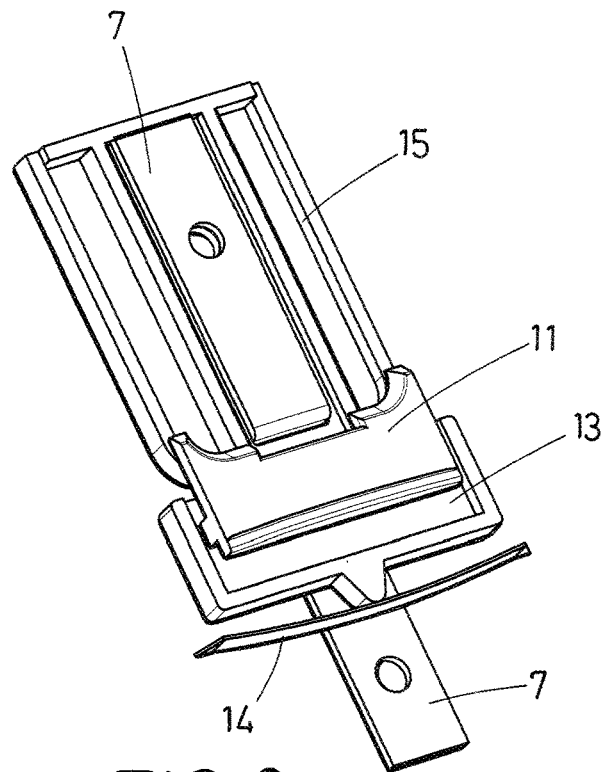
FIG. 8 shows a perspective view in which the folding tab is not drawn, in order to show the arrangement of the elastic tape under said tab.

In FIG. 8 it can be seen how the case may comprise an elastic tape gripping item (15) which is located under the folding tab (3) and which comprises a housing for the elastic tape (7) which in turn is attached to the folding tab (3) and the base (1). This way the elastic tape (7) is not too taut, avoiding the need of applying force by the user when moving the folding tab (3) to the desired gripping position.

Preferably, the elastic tape gripping item (15), the pawl holder (13) and the strapping (14) are located on the supplementary part (8). This simplifies the assembly of the case, as all the moving parts are linked directly to the supplementary part (8) and it is only necessary to locate it in the space produced by the bulge in the base (1) and to affix it to the same.

Preferably also the base (1) comprises a number of gaps (16) around the recess (2) of a depth at least equal to the thickness of the folding tab (3), as may be seen in FIG. 4. This greatly improves the user's comfort when desires to move the folding tab (3) to the gripping position, as in this way there is direct access to the tab itself. Likewise, in the embodiment where the base (1) comprises the gaps (16) and the case also comprises a supplementary part (8), the latter comprises a number of second gaps (16.1) corresponding to the gaps (16) of the base (1).

Figure 9:
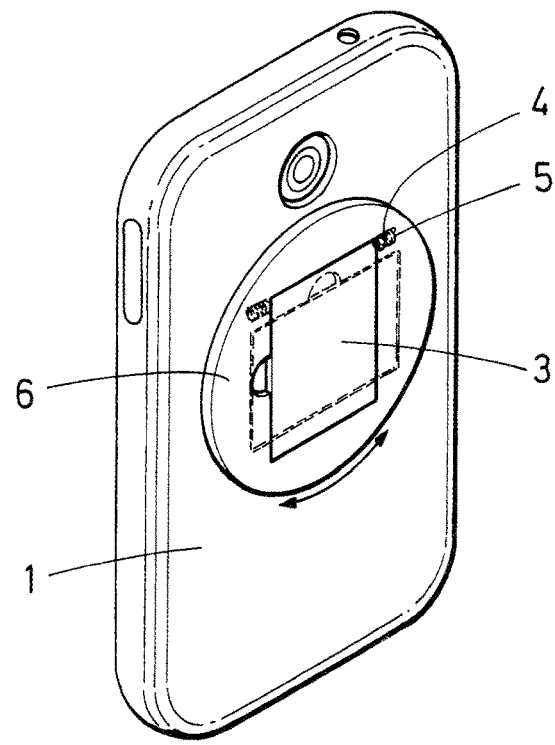
FIG. 9 shows a view of the case in an embodiment where the folding tab may be rotated to enable the user to hold the mobile device in the most convenient way at all times.

In an example of embodiment, shown in FIG. 9, the case comprises a flat, circular rotating item (6) linked to the base (1) with rotating capability. On this rotating item (6) are placed the recess (2), the folding tab (3) and the elastic element.

This rotating item (6) is the part which enables the user to change the viewing position of the device without having to release the mobile device. Further, during this operation the user's fingers are still gripped between the folding tab (3) and the base (1) of the case so there is no danger of dropping the mobile device.

Additionally, the case may also comprise at its base (1) first locking elements arranged in correspondence with the rotating item (6), and at the rotating item (6) a number of second locking elements intended to interlock with the first locking elements.

When the first locking elements and the second locking elements interlock, the position of the rotating item (6) is fixed. In order to change this position, the user only has to exert a slight force in the direction in which it is desired to move the rotating item (6), and said locking elements are released to allow rotation to the next locking element or to the desired position.

The present invention also contemplates preferred embodiments of the case where said case also comprises the pawl (11) on the rotating item (6). Likewise, embodiments where it might also comprise the supplementary part (8), the pawl holder (13), the strapping (14) and the elastic tape gripping item (15) would also be covered by the protection of the present invention.

The invention claimed is:

1. A mobile terminal case comprising:
   a base intended to cover at least part of the rear side of a mobile device and said base comprising one recess,
   a folding tab attached to the base with possibility of tilting between:
     a resting position where it is housed within the recess and leveled with the base; and
     a gripping position where it is inclined with respect to the base, and at least one elastic element attached to the folding tab and to the base configured and positioned so as to exert a returning force on the folding tab in the direction of the resting position, wherein the case further comprises a pawl located within the recess and with possibility of sliding movement within said recess and the case further comprises a pawl holder located in the recess under the pawl and joined to the same and the base comprises a bulge in which is housed a supplementary part which comprises a housing coinciding at least partially with the recess in the base and the pawl holder is linked to a strapping configured to exert a returning force on the pawl holder.

2. The case of claim 1 wherein the case further comprises a shaft on which the folding tab tilts and which is arranged longitudinally at one of the extremities of said folding tab.

3. The case of claim 1 wherein the elastic element is a torsion spring linked to the folding tab and to the base and is configured to exert a returning force on the folding tab in the direction of the recess.

4. The case of claim 3 wherein the case further comprises a shaft on which the folding tab tilts and which is arranged longitudinally at one of the extremities of said folding tab and the torsion spring is located around the shaft.

5. The case of claim 1 wherein the elastic element is an elastic tape which is linked to the folding tab and housed at least partially in the recess and is configured so as to exert a returning force on the folding tab in the direction of the recess.

6. The case of claim 5 wherein the case further comprises an elastic tape gripping item located under the folding tab and which comprises a housing for the elastic tape which in turn is attached to the folding tab and to the base.

7. The case of claim 6 wherein the base comprises a bulge in which is housed a supplementary part which comprises a housing coinciding at least partially with the recess in the base and the pawl holder is linked to a strapping configured to exert a returning force on the pawl holder and the elastic tape gripping item, the pawl holder and the strapping are located on the supplementary part.

8. The case of claim 1 wherein the recess is a through-hole.

9. The case of claim 1 wherein the folding tab has a size and configuration equal to those of the recess.

10. The case of claim 9 wherein the base comprises a number of first locking elements arranged in correspondence with the rotating item, and said rotating item comprises a number of second locking elements intended to interlock with the first locking elements in order to fix the position of the rotating item.

11. The case of claim 1 wherein the base comprises a bulge in which is housed a supplementary part which comprises a housing coinciding at least partially with the recess in the base.

12. The case of claim 1 wherein the folding tab has a perimetral groove in the extremity which is displaced with respect to the base, configured to receive one extremity of the pawl in the resting position.

13. The case of claim 1 wherein the base comprises a number of gaps around the recess of a depth at least equal to the thickness of the folding tab.

14. The case of claim 1 wherein the case comprises a flat, circular rotating item linked to the base with possibility of rotation and in said rotating item are placed the recess, the folding tab and the elastic element.

15. A mobile terminal case comprising:
a base intended to cover at least part of the rear side of a mobile device and said base comprising one recess,
a folding tab attached to the base with possibility of tilting between:
  a resting position where it is housed within the recess and leveled with the base; and
  a gripping position where it is inclined with respect to the base; and
at least one elastic element attached to the folding tab and to the base configured and positioned so as to exert a returning force on the folding tab in the direction of the resting position,
wherein the elastic element is an elastic tape which is linked to the folding tab and housed at least partially in the recess and is configured so as to exert a returning force on the folding tab in the direction of the recess,
wherein the case further comprises an elastic tape gripping item located under the folding tab and which comprises a housing for the elastic tape which in turn is attached to the folding tab and to the base, and
wherein the base comprises a bulge in which is housed a supplementary part which comprises a housing coinciding at least partially with the recess in the base and the pawl holder is linked to a strapping configured to exert a returning force on the pawl holder and the elastic tape gripping item, the pawl holder and the strapping are located on the supplementary part.

16. A mobile terminal case comprising:
a base intended to cover at least part of the rear side of a mobile device and said base comprising one recess,
a folding tab attached to the base with possibility of tilting between:
  a resting position where it is housed within the recess and leveled with the base; and
  a gripping position where it is inclined with respect to the base; and
at least one elastic element attached to the folding tab and to the base configured and positioned so as to exert a returning force on the folding tab in the direction of the resting position,
wherein the folding tab has a size and configuration equal to those of the recess, and
wherein the base comprises a number of first locking elements arranged in correspondence with the rotating item, and said rotating item comprises a number of second locking elements intended to interlock with the first locking elements in order to fix the position of the rotating item.

* * * * *